Dec. 3, 1940.  W. W. WILLIAMS  2,223,435
FLUID FUEL BURNING APPARATUS
Filed Aug. 11, 1938  8 Sheets-Sheet 5
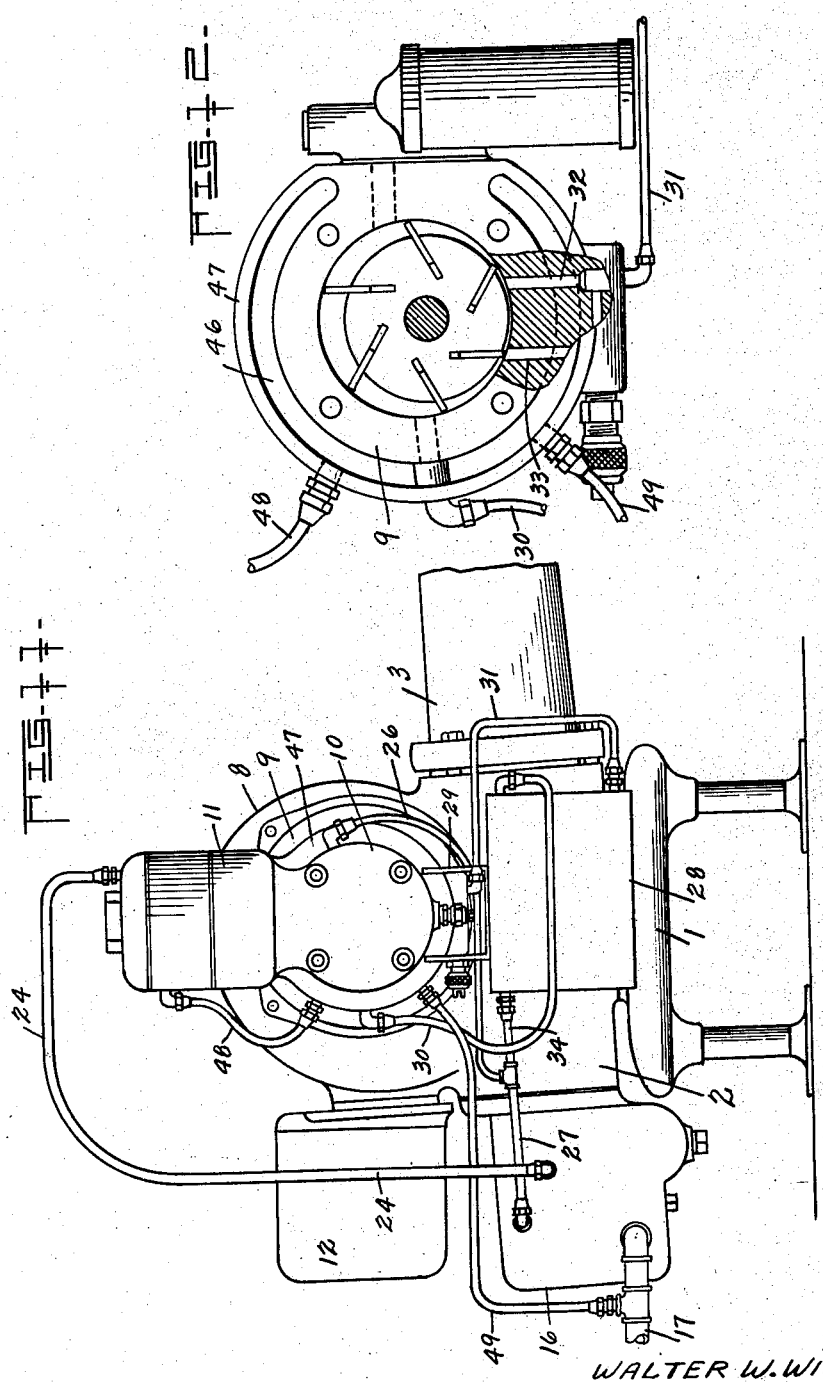
INVENTOR.
WALTER W. WILLIAMS
BY
ATTORNEY.

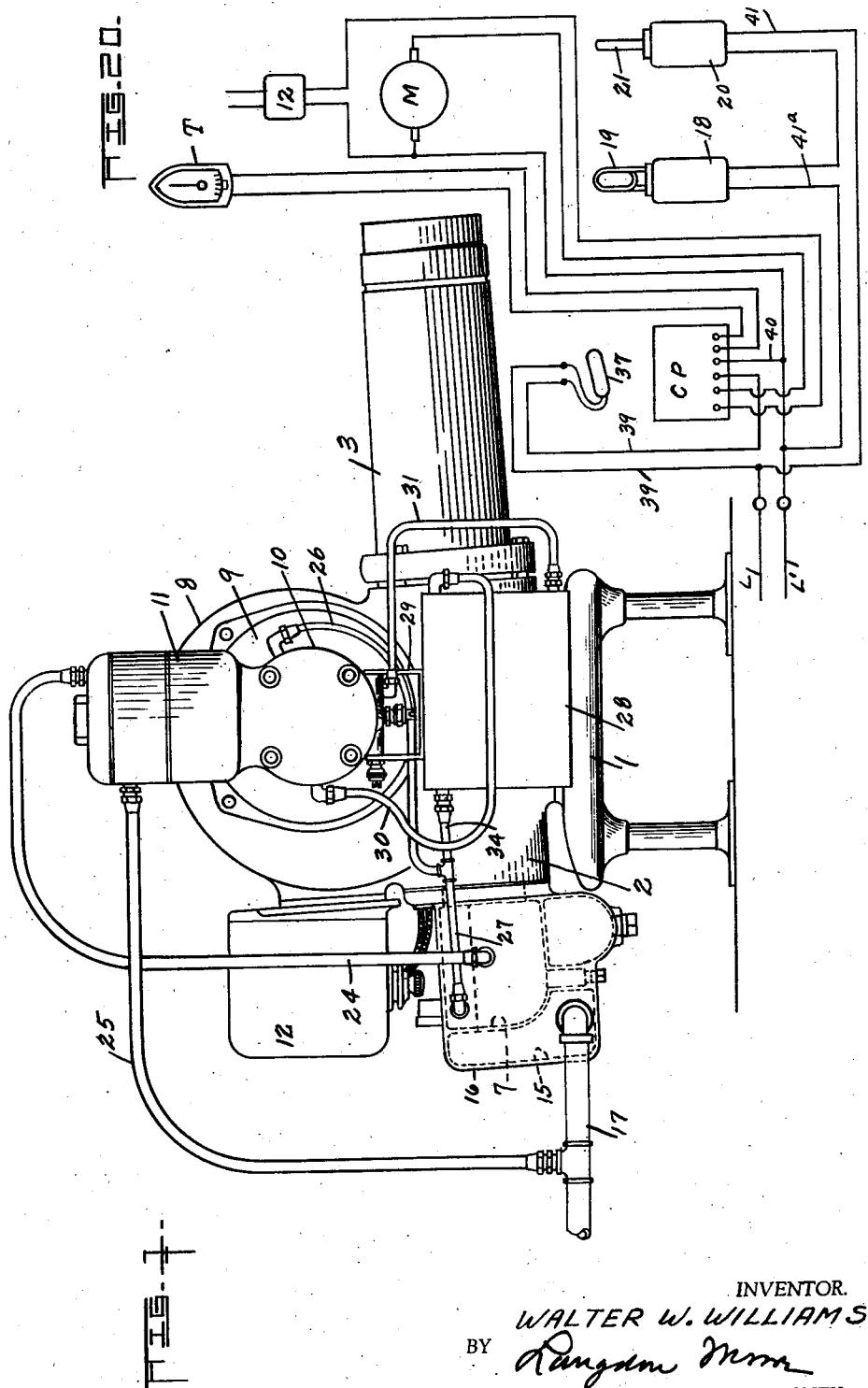

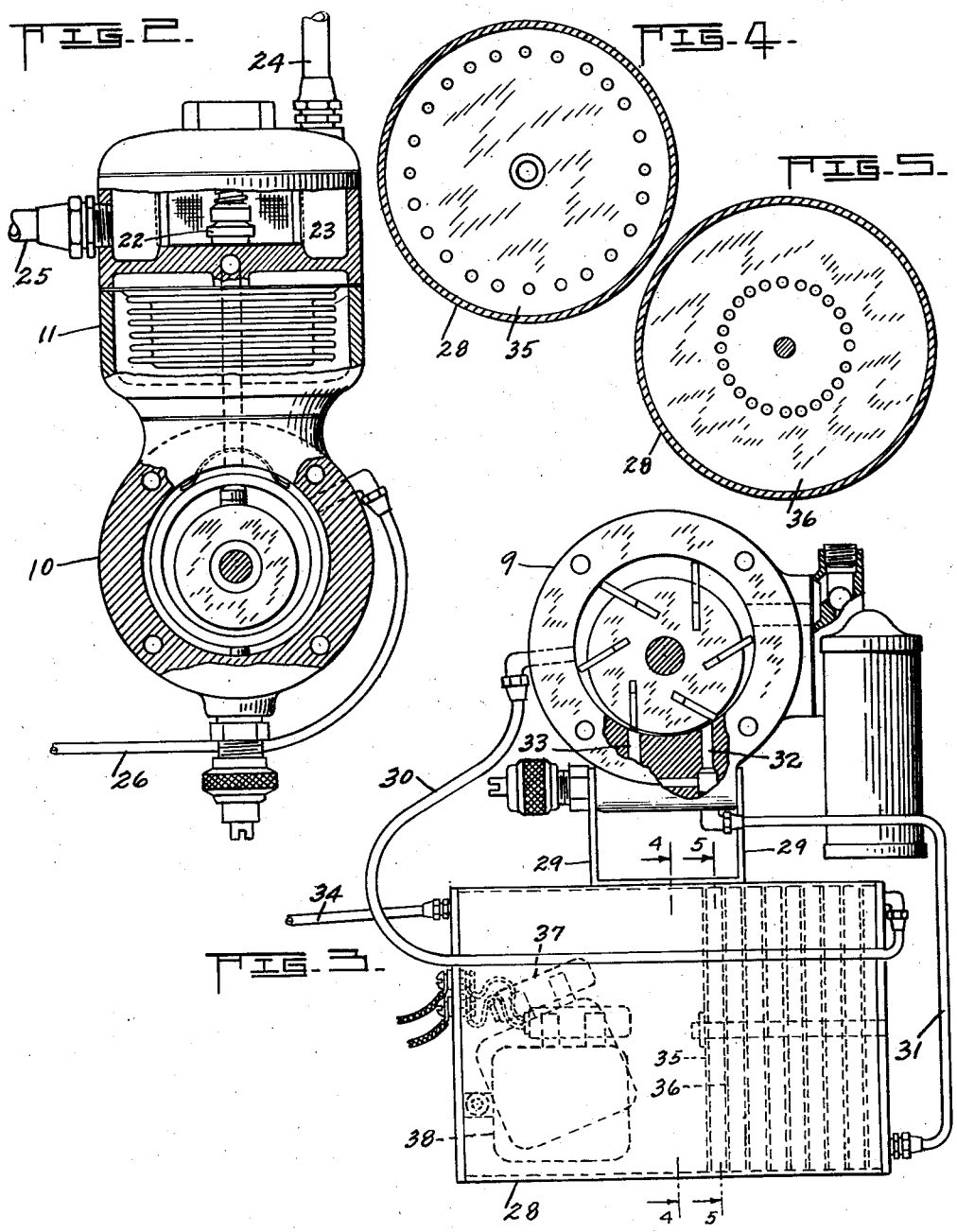

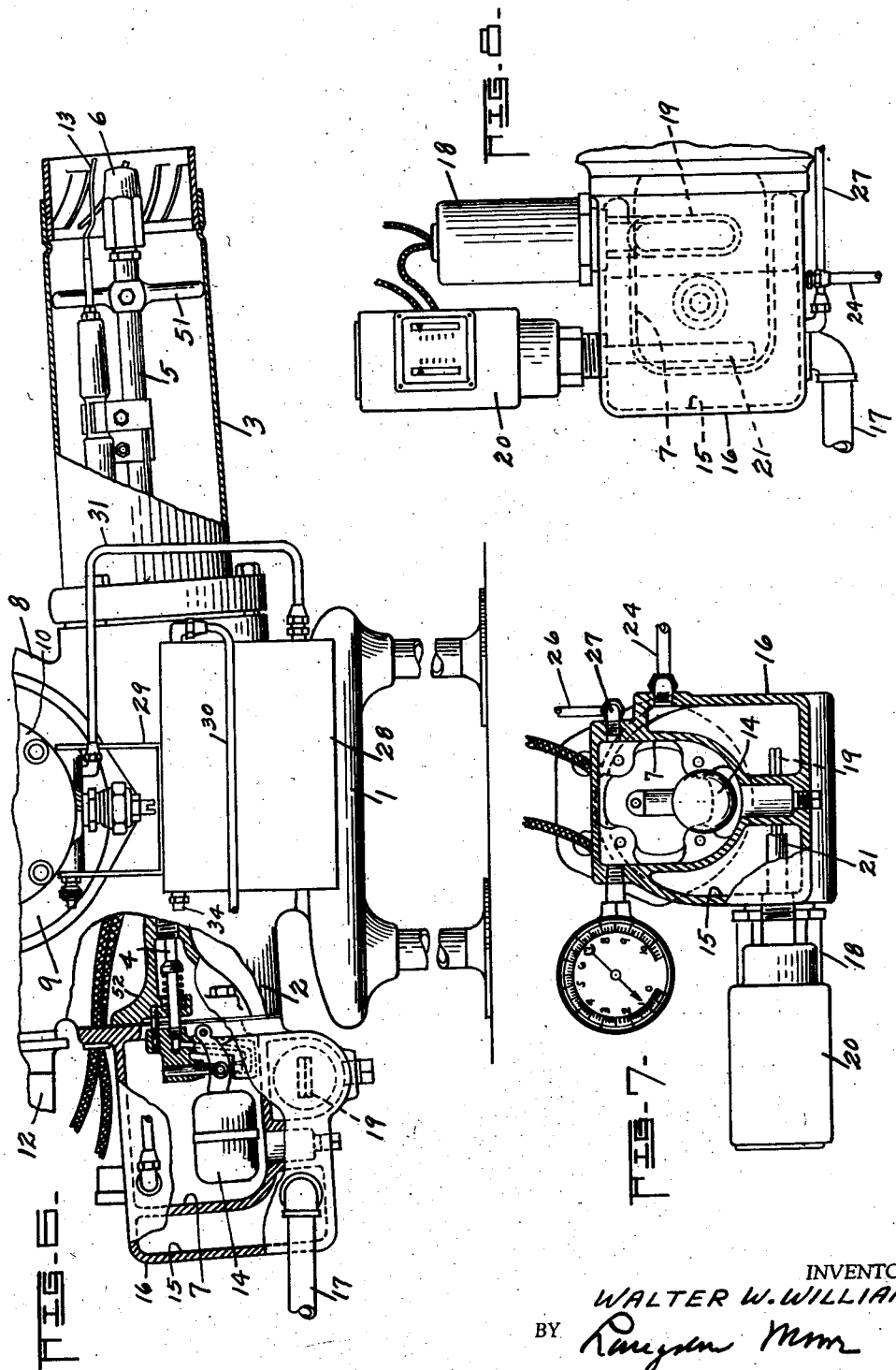

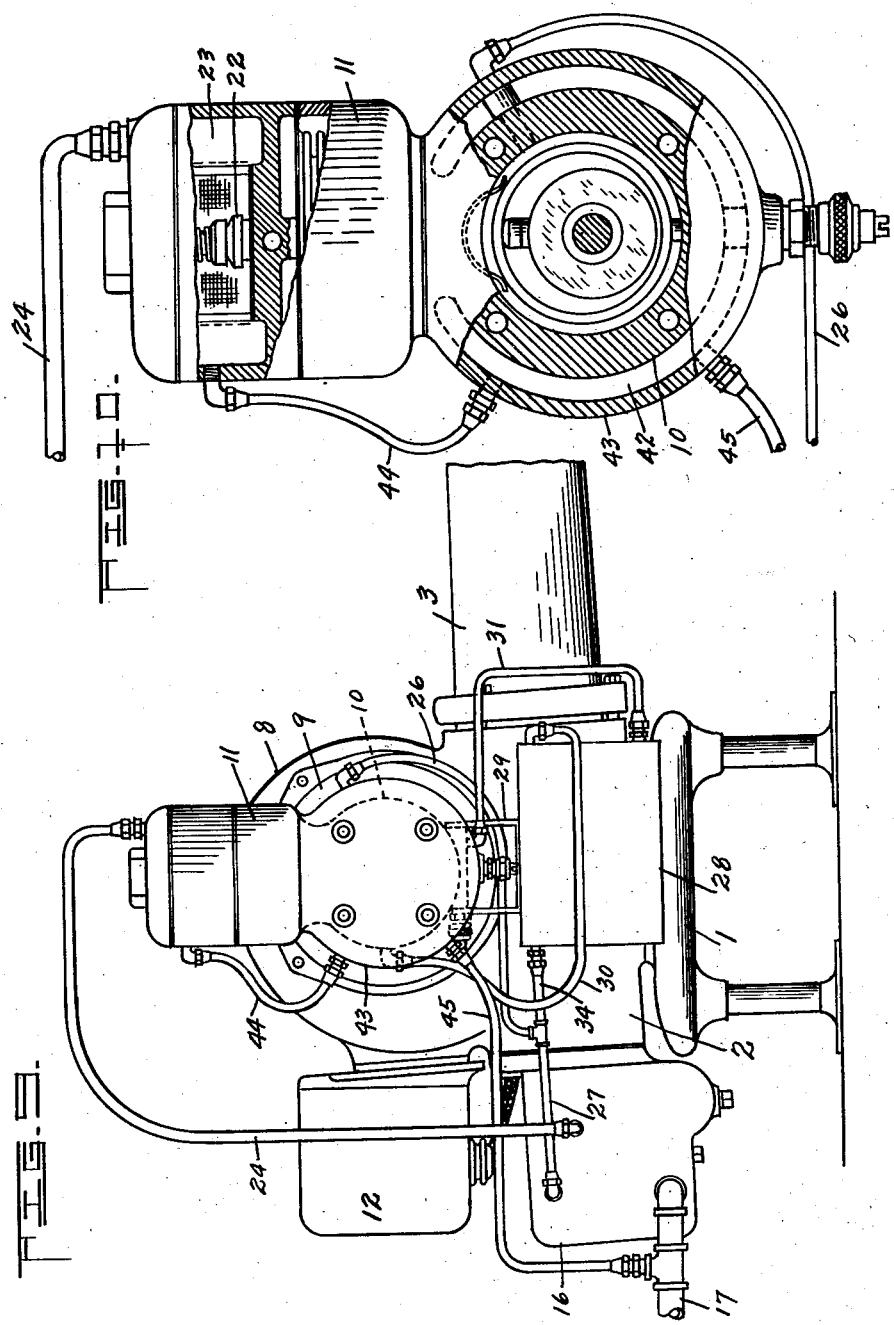

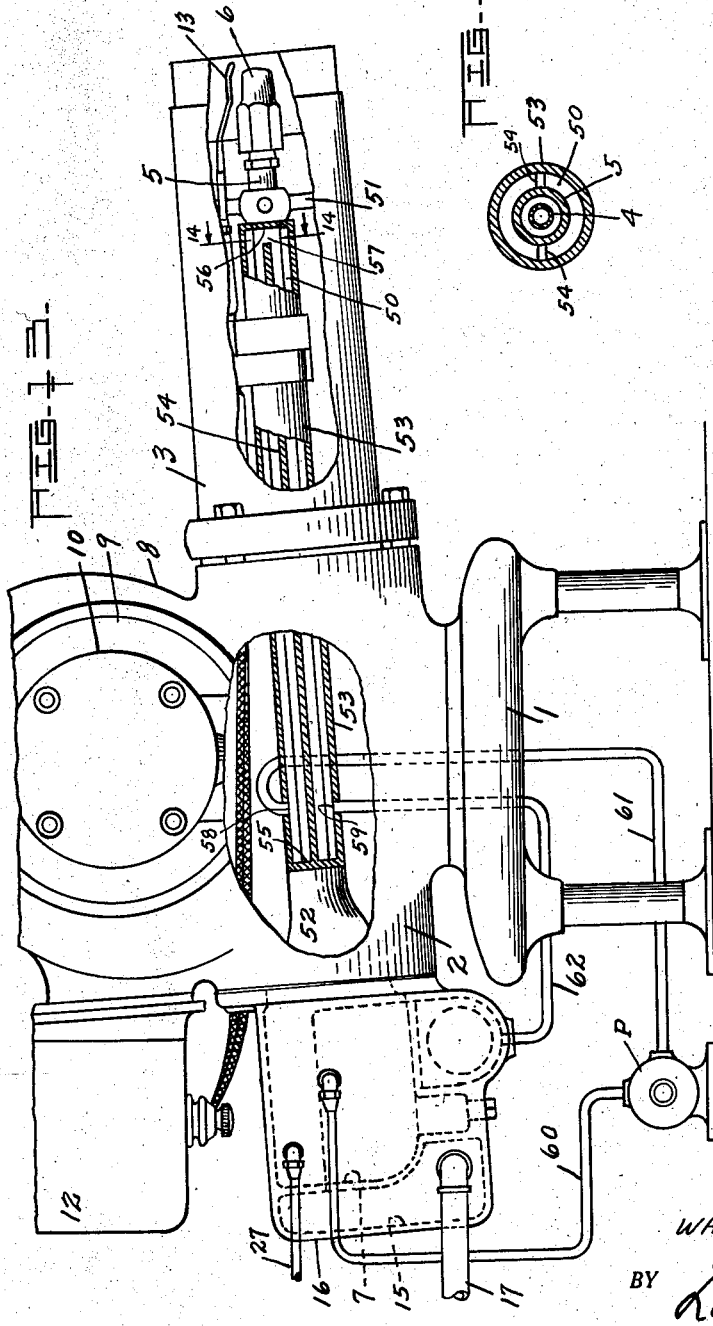

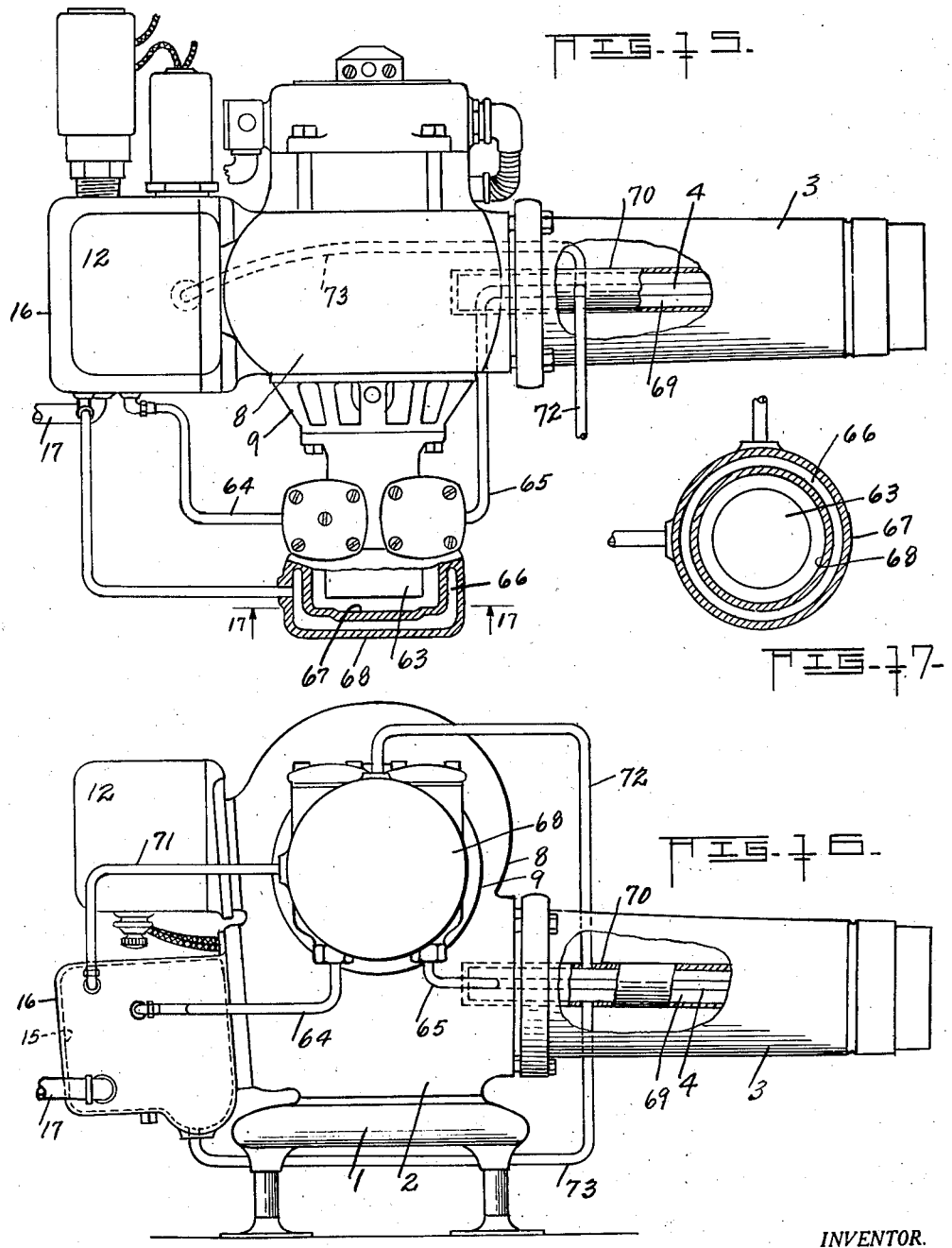

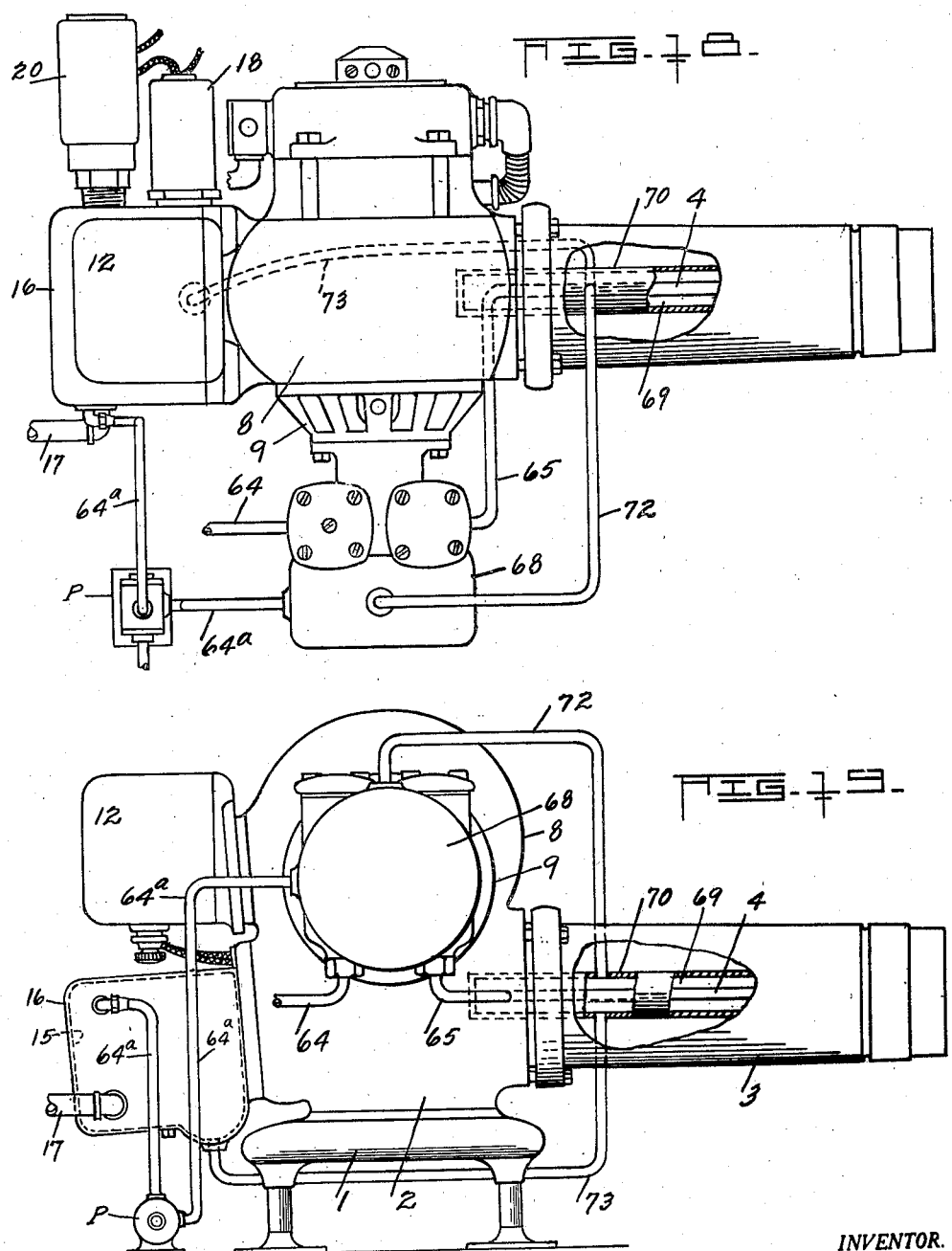

Patented Dec. 3, 1940

2,223,435

UNITED STATES PATENT OFFICE 2,223,435

FLUID FUEL BURNING APPARATUS

Walter W. Williams, Bloomington, Ill.

Application August 11, 1938, Serial No. 224,329

4 Claims. (Cl. 158—36)

This invention relates to improvements in fluid fuel burning apparatus and more particularly to the provision of means employed in conjunction with the means for feeding fuel to the nozzle to reduce the viscosity of heavy oils, not ordinarily adapted for such use, sufficiently to be atomized for efficient combustion in both low pressure and high pressure fluid fuel burners of the present day.

With this and other objects in view, reference is made to the accompanying sheets of drawings in which preferred forms of this invention are illustrated with the understanding that detailed changes may be made without departing from the scope thereof.

In the drawings:

Figure 1 is a view in side elevation of a commercial low pressure type of oil burner to which one form of this invention has been adapted.

Figure 2 is an enlarged detailed view in vertical section taken through the oil valve and metering shown in Figure 1.

Figure 3 is an enlarged detailed view partly in vertical section through the air pump casing shown in Figure 1 and illustrating the lubricant tank in side elevation.

Figure 4 is an enlarged detailed view in vertical section taken on the line 4—4 of Figure 3, looking in the direction of the arrows.

Figure 5 is a similar view taken on the line 5—5 of Figure 3, looking in the direction of the arrows.

Figure 6 is an enlarged fragmentary view partly in section and partly in side elevation with parts broken away to show the heating chamber, float valve chamber, oil pipe and burner nozzle.

Figure 7 is a fragmentary view in end elevation of Figure 6, showing the float valve and heating chambers in section.

Figure 8 is a top plan view of Figure 7.

Figure 9 is a view in side elevation of a commercial low pressure type of oil burner similar to Figure 1 to which has been added an additional heating chamber.

Figure 10 is a fragmentary enlarged detailed view partly in section and partly in side elevation of the oil valve and metering pump casing.

Figure 11 is a view in side elevation with parts broken away similar to Figure 9 in which a different type of heating chamber has been added.

Figure 12 is an enlarged fragmentary view partly in section and partly in side elevation taken through the air pressure pump casing.

Figure 13 is an enlarged view in side elevation with parts broken away to show a heating chamber within the draft pipe and about the air and oil pipe leading to the nozzle assembly.

Figure 14 is a view in section taken on the line 14—14 of Figure 13, looking in the direction of the arrows.

Figure 15 is a top plan view, with parts broken away, illustrating the application of this invention to a commercial type of high pressure oil burner, and partly in section.

Figure 16 is a view in side elevation of Figure 15 with parts broken away and partly in section.

Figure 17 is a view in section taken on the line 17—17 of Figure 15, looking in the direction of the arrows.

Figures 18 and 19 are views similar to Figures 15 and 16 illustrating a different application of this invention to a commercial high pressure type of oil burner.

Figure 20, on Sheet 1 of the drawings, is a wiring diagram of the circuits employed in the various forms of this invention illlstrated in Figures 1 to 19, inclusive.

Figures 1 to 14 of the drawings accompanying this application illustrate the adaption of this invention to a commercial low pressure oil burner, the construction and operation of which is disclosed in a general way in this applicant's prior Patent No. 1,831,277 dated November 10, 1931, as including a base 1 upon which is mounted a casing 2 from which extends a draftpipe 3 surrounding the oil pipe 4 contained within the air pipe 5 extending from the nozzle 6 to the float valve chamber 7, as shown in Figures 1 to 6. The casing 2 supports a fan housing 8 which mounts a fan blower on a horizontal shaft extending through both sides of the casing, not shown, and the casing 2 mounts on one side an air pressure pump casing 9 and a contiguous metering pump casing 10, as shown in Figure 1, with a motor casing mounted on the opposite side, not shown, but disclosed in said prior Patent No. 1,831,277. The metering pump casing 10 mounts an oil valve casing 11 thereabove. The rear of the casing 2 also mounts a transformer 12 for the ignition points 13 at the end of the nozzle 6, as shown in Figure 6. In this type of commercial low pressure oil burner, oil from the tank or other source passes through the oil valve in casing 11 into the metering pump within the casing 10 and at the same time air is placed under pressure by the pump within the pump casing 9 and the oil from the metering pump together with the air under pressure from the air pump are simultaneously discharged within the float valve chamber 7. The oil received within the float valve chamber lifts the float valve 14 and the pressure of the air above the oil in the chamber forces the oil through the oil pipe 4 while the air under pressure above the oil passes through the air pipe 5 so that the oil and air are both discharged to the nozzle 6, as disclosed in this applicant's prior Patent No. 2,015,048, of September 17, 1935.

It has been found in practice that an oil burner such as the commercial oil burner above described will efficiently operate with the fuel oil now commercially sold for this purpose, but the heavier fuel oils such as those known as grades No. 5 and No. 6 of the American Society for Testing Materials are too viscous to efficiently be atomized to produce combustion in the commercial oil burner.

It has also been found that by the use of this invention, hereinafter described, the grade No. 5 oil of the American Society for Testing Materials with a maximum viscosity of 40 seconds under Saybolt-Furol viscosity test method at 122° F. and a minimum of 60 seconds under Saybolt-Universal viscosity at 100° F., when sufficiently heated, the viscosity of said No. 5 grade at the maximum viscosity above described is reduced to a point where it can be readily atomized and it has been found in practice that the oil when heated to 225° F., in accordance with this invention, can be readily atomized and will burn efficiently in the commercial oil burner.

In carrying out this invention an oil chamber 15 is provided about the casing of the float valve chamber 7 preferably by a spaced apart casing 16 which may be cast integral with the float valve chamber 7, as shown in Figure 7. Oil from a tank or other source is led through a pipe 17 into the interior of the oil chamber 15. A suitable electric heater 18 of commercial structure is mounted in the wall of the casing 16 to support its heating element 19 within the oil contained in the chamber 15. A suitable thermostatic control 20 of commercial structure is also mounted in the wall of the casing 16 to support its thermal actuating member 21 within the oil in the chamber 15. The heater 18 and thermostatic control 20 are connected in series with the source of electricity to maintain an even temperature of a predetermined degree of the oil within the chamber 15.

The oil valve casing 11 supported upon the metering pump casing 10, shown in section in Figure 2, is constructed as described in this applicant's prior Patent No. 2,087,011, of July 13, 1937, in which the oil valve 22 is mounted to admit oil from within a chamber 23 into the metering pump within the casing 10. In accordance with this invention the heated oil within the chamber 15 is conducted by a pipe 24 to enter the chamber 23 in the same manner as in the commercial form oil from the tank is admitted. When the oil burner is operating in a normal manner the heated oil is conducted from chamber 23 to the interior of the metering pump. In the event that the oil burner mechanism is idle a circulation of the heated oil through the chamber 23 may be set up by a pipe 25 leading from the opposite side of the chamber 23 from the pipe 24 which will conduct the oil back to the heating chamber 15, such as by connecting the pipe 25 to the oil supply pipe 17 or to the intake side of the casing 16. When the oil burner mechanism is idle the heated oil will be circulated through a thermal siphon action through pipe 24, chamber 23 and pipe 25.

In the construction described, when the oil burner mechanism begins to operate the oil in the chamber 23 of the oil valve has been preheated to the predetermined degree in accordance with the setting of the thermostatic control 20. The initiation of the operation of the burner mechanism lifts the oil valve 22 and the oil passes into the metering pump casing from which it is discharged through pipe 26 and pipe 27 into the float valve chamber 7. In the commercial oil burner previously described, the oil from the metering pump is delivered into the air pump casing and the oil and air under pressure are delivered together to the float valve chamber. In that case the oil from the metering pump acts as a lubricant for the moving parts of the air pump. Therefore, when the oil is delivered from the metering pump to the float valve chamber without passing through the air pump, means to lubricate the moving parts of the air pump must be provided. To this end a tank 28 containing lubricant is supported below the air pump casing 9 by brackets 29 and the air under pressure is led from the air pump casing 9 through pipe 30 to the top of the lubricant tank 28. The pressure upon the lubricant forces it through a pipe 31 leading from the bottom of the tank 28 to the lubricating ducts 32 and 33 in the wall of the pump casing 9. The air under pressure within the tank 28 is then conducted by a pipe 34 leading from the opposite end of the tank to the pipe 27 to be conveyed with the oil from the metering pump to the interior of the float valve chamber 7.

The oil delivered into the float valve chamber 7 is subjected to the heat of the oil contained in the surrounding oil chamber 15 before it is delivered through the oil pipe 4 to the nozzle 6, thus insuring a proper heating of the heavy oil at the time it is delivered to the nozzle to be efficiently atomized.

In order to diffuse the air entering the lubricant tank 28 under pressure from the pipe 30, it is preferable to provide a plurality of spaced apart baffle plates 35 and 36 in which the plates 35 are perforated adjacent their periphery and alternate with the plates 36 which are perforated adjacent their centers, as shown in Figures 4 and 5.

It is also desirable to stop or prevent operation of the oil burner mechanism in the event the air pump lubricant in the tank 28 becomes exhausted and to this end a float operated mercury tube switch 37 is mounted upon a float 38 which will tilt the switch to close a circuit between the commercial line L and the burner control panel CP as long as there is sufficient lubricant in the tank 28, but when the level of the lubricant in the tank descends to a dangerous level the float will tilt the switch 37 to open the commercial circuit and the burner mechanism will cease to operate.

Figure 20 illustrates a wiring diagram such as is usually employed with the commercial oil burner herein described in which the incoming commercial line L is connected by wire 39 through the float operated switch 37 in the lubricant tank 28 and then to the burner mechanism control panel CP of commercial construction. The return from the control panel is connected by wire 40 to the commercial return line L'. The heater 18 and the thermostat control 20 therefor are connected by wires 41 and 41ᵃ in multiple, or across the line, in the commercial circuit before it passes through the switch 37 so that the heater 18 is always in circuit unless the commercial line is cut off. The switch 37 is in the circuit which when completed operates the burner motor M so that whenever the motor is in operation the air pump lubricant will be supplied to the pump and when the level of the lubricant in the tank 28 reaches a dangerous line, the switch 37 opens the motor circuit and the burner mechanism becomes idle. In the wiring diagram, 12 indicates the transformer. The room thermostat which controls the normal operation of the burner mechanism is indicated by T.

Figures 9 and 10 illustrate a further development of this invention in which an oil chamber 42 is provided about the metering pump casing 10 by casing 43 surrounding and spaced apart from the casing 10, as shown in section in Figure 10, and which may, if desired, be cast integral with it. In this form the pipe 26 leading from the interior of the metering pump casing is extended through the chamber 42 and casing 43. In this form a pipe 44 is substituted for the pipe 25, in the other form, and pipe 44 connects the chamber 23 of the valve casing 11 to the chamber 42 about the metering pump casing which in turn is connected by pipe 45 to supply pipe 17 or intake of casing 16.

In this form a thermo-siphon action circulates the oil heated within casing 16 through the oil valve casing 11 and about the metering pump casing while the burner mechanism is idle.

Another modification is shown in Figures 11 and 12 in which the casing 43 is omitted from about the metering pump casing 10, but an oil chamber 46 is provided about the air pump casing 9 by a casing 47 surrounding and spaced apart from the casing 9.

In the above modification of Figures 11 and 12, heated oil is circulated from the chamber 23 from the oil valve casing 11 through the pipe 48 to the oil chamber 46 formed about and spaced from the casing 9 of the air pump, the chamber 46 being surrounded by the casing 47. The chamber 46 is connected by a pipe 49 to the supply line pipe 17 of the casing 16, the casing 16 being the heating chamber for the oil from the supply line. The pipe 30 extending from the interior of the air pump casing 9 passes through the casing 47 and is connected to the lubricant tank 28, the pipe 26 likewise being connected to the lubricant tank 28 from the interior of the metering pump. The present invention also contemplates further modifications such as forming the metering pump and the air pump into one complete operating unit, and in this event it may be accomplished by disposing the two separate units, as shown in Figures 10 and 12, together, and casting the separate casings 9 and 10, and 43 and 47, integral with each other. In such event the piping, of course, would remain the same, as shown in Figures 1, 10, 11 and 12.

Another form of this invention illustrated in Figures 13 and 14 in which an oil chamber 50 is formed about the assembled air pipe 5 containing the oil pipe 4, as shown in Figure 6, between the nozzle support 51 and an extension 52 of the float valve casing 7 by interposing a casing 53 about the air pipe 5 concentric therewith and spaced apart therefrom. It is preferable to construct the casing 53 with an end closure 55 abutting the end of the casing 52 and with a horizontal rib or partition 54 preferably cast integral with the end closure 55 and opposite side walls of the casing 53 to engage opposite sides of the air pipe 5 and terminated in spaced apart relation from the end closure 56 adjacent the nozzle support 51. The partition 54 forms an upper and lower chamber above and below the longitudinal center of the air pipe 5 which chambers communicate with each other at the end adjacent the nozzle 6 through the openings 57 provided by the spaced apart ends of the partitions, as shown in Figure 14.

In this form it is preferable to cause oil heated in the manner hereinbefore described to flow through an opening 58 in the upper compartment of the casing 53 adjacent the rear end next to the casing 52, flow through said upper compartment, pass through the openings 57 at the opposite end, and into the lower compartment below the partition 54 and be discharged through an opening 59 in the lower wall of the casing 53 opposite the intake opening 58 to be returned to the heater. The circulation may be set up in any one of the ways by any one of the means herebefore described. However, this invention also contemplates the use of a separate independent circulating pump P which may be an electrically operated pump connected in the circuit containing the heater 18 and control 20 mounted in the casing 16 to heat the oil in the chamber 15 admitted by the supply pipe 17. When employing the pump P as the means for circulating the heated oil, it is preferable to connect the intake side of the pump by a pipe 60 leading from the top of the oil chamber 15 within the casing 16 and the discharge side of the pump by a pipe 61 to the intake opening 58 of the casing 53 and to connect the outlet opening 59 of the casing 53 by a pipe 62 to the interior of the oil chamber 15 through the bottom of the casing 16.

By this means the casing 53 surrounds the assembled air and oil pipes 5 and 4 and the circulation of preheated oil thereabout will heat the oil as may remain in the oil pipe 4 after the burner mechanism has become idle and may be retained at a temperature to be readily atomized when the operation of the oil burner is again started.

The figures of the drawings so far described illustrate various means applied to a commercial type of low pressure oil burner to carry out the method of preheating fuel oils too heavy or viscous to ordinarily be efficiently used in this commercial type of oil burner. Figures 15 to 19, inclusive, illustrate constructions whereby the same method may be applied to commercial types of high pressure oil burners in which the oil is atomized by creating in the oil sufficient pressure to force it through a small opening in the nozzle.

Figures 15, 17, 18 and 19 illustrate a commercial type of high pressure oil burner including a structure somewhat similar to that heretofore described and in which the corresponding parts are indicated by similar reference numerals. In this type of burner the oil is usually delivered by pipe from the source of supply to the intake side of a compressor and then discharged through an oil pipe arranged concentric within the draft pipe 3 to the burner nozzle and the pressure forces the oil through a small orifice in the nozzle in an atomized form. In such a burner the compressor takes the place of the metering pump and air pump in the low pressure burner mechanism so that in the high pressure burner there is no float chamber and float. In adapting the high pressure burner to this improved method of preheating the oil, a casing similar to the casing 16 is preferably secured in the same relative position to the casing 2 and in this instance the casing 16 provides an oil chamber 15 throughout its entire interior extent and mounts the commercial heater 18 and thermostatic control 20 therefor in the walls of the casing 16 in the same manner as in the low pressure burner. A pipe 17 leads the oil from a source of supply to the chamber 15 within the casing 16. A two-cylinder compressor 63 is shown mounted on the end of the motor driven shaft operating the fan blower, not shown. The intake side of the compressor 63 is connected by pipe 64 to the interior of the oil heating chamber 15 and the discharge side of the compressor is connected by pipe 65 to the end of the oil pipe 4 within the casing 2 so that the action of the compressor forces the oil under pressure through the usual type of atomizing nozzle, not shown. In the form shown in Figures 15 to 19 an oil chamber 66 is formed about the compressor 63 by spacing apart walls 67 and 68 of the compressor cover and the oil within the oil pipe 4 is heated by forming an oil chamber 69 thereabout by providing a casing 70 concentric with and spaced apart from the oil pipe 4 and extending from its inner end to the nozzle. The heated oil in the chamber 16 will pass by thermo-siphonic action through a pipe 71 leading from the casing 16 into the chamber 66 and from the chamber 66 through pipe 72 to the chamber 70 and from the chamber 70 by pipe 73 back to the underside of the casing 15.

In this construction the operation of the compressor 63 draws heated oil from the chamber 15 and forces it through the oil pipe 4 to the atomizing nozzle and when the burner mechanism is idle the thermo-siphonic action circulates the heated oil from the chamber 15 about the compressor 63 and then about the oil pipe 4 so that such oil as may remain in the compressor and in the oil pipe 4 will be sufficiently heated to reduce its viscosity sufficiently to be readily atomized when the operation of the burner is again started.

In Figures 18 and 19 the application of a circulating pump P is illustrated. In this case the operation of the pump P produces a positive circulation from the chamber within the casing 16 by connecting the pipe 64 to the intake side of the pump P and by providing a pipe 64a connecting the discharge side of the pump P to the chamber 66. In the case where a circulating pump is employed it is not necessary to have the casing 16 mounted upon the burner as the casing 16 may be located at any desirable point because the circulation depends upon the operation of the pump and not upon a thermo-siphonic action.

As heretofore stated, most oil burners, and particularly those for domestic heating purposes, have been constructed to use the distillate oils, or light fuel oils such as grade No. 1, grade No. 2, and grade No. 3 of the American Society for Testing Materials, which are distilled from crude petroleum at certain stages of distillation processes and possess the characteristics of low viscosity and easy volatilization. Such oils are readily adapted to pass through the fuel burning apparatus, and on account of their relatively low viscosity at ordinary temperatures will flow readily through the small conduits to be atomized at the burner nozzle and on account of their volatility will be readily ignited.

On the other hand, the residual oils, such as, for example, those known by grade Nos. 5 and 6 of the American Society for Testing Materials have a relatively high viscosity at ordinary temperatures and are substantially non-volatile. These oils are thick and the gummy nature of such oils at ordinary temperatures are not adaptable to pass through the small conduits of the oil burner mechanism and are not easily atomized. The above described invention provides means for taking advantage of the heat values at low cost of the heavier fuel oils, such as grade No. 5 oil of the American Society for Testing Materials, and the means to accomplish this may be added readily to the commercial oil burner structures now on the market without providing particular means for atomizing and igniting the oil.

What I claim is:

1. In an electrically operated and controlled fluid fuel burning apparatus, including an oil pump and an air pump for discharging oil and air under pressure into a float valve chamber with an oil pipe and an air pipe surrounding the oil pipe leading from the float valve chamber to the nozzle for delivering oil and air under pressure at the nozzle, and means for rendering heavy fuel oils normally of a degree of viscosity too great to flow easily through the oil pipe from the float valve chamber adaptable to this purpose including a casing spaced apart from and surrounding the walls of the float valve chamber for receiving heavy fuel oil from the source of supply, means for heating the heavy oil in said chamber and maintaining it at a pre-determined temperature sufficient to reduce its viscosity, and means for circulating the oil from the heating chamber about the valve on the intake side of the oil pump and about the oil pump casing when the burner is idle and admit the pre-heated oil from the chamber into the oil pump when the burner is operating, whereby the viscosity of the heavy oil is reduced so that it may be readily discharged from the float valve casing through the oil pipe to the burner nozzle.

2. The structure of claim 1 wherein means is provided to circulate the heavy oil from the heating chamber about the air pump when the burner is idle and continue to circulate the heated oil about the air pump when the burner is in operation.

3. The structure of claim 1 wherein means is provided by the pressure created in the air pump before it is discharged into the float valve chamber to force lubricant into the air pump to lubricate the moving parts thereof.

4. The structure of claim 1 wherein the means for heating the heavy oil in the chamber about the float valve casing includes an electric heater connected in circuit with an adjustable thermostatic control therefor responsive to a predetermined temperature of the oil within the chamber and in circuit with the source of electricity for operating the oil burner, and wherein a lubricant tank is provided with means for conducting the air under pressure through the lubricant tank on its way to the float valve chamber to force the lubricant into the moving parts of the air pump, and wherein the said circuit to the heater for the heavy oil heating chamber passes through a float operated switch within the lubricant tank normally closed and operated by the float when the level of the lubricant descends to a dangerous level to open the circuit to the burner mechanism.

WALTER W. WILLIAMS.